United States Patent [19]

Gelman

[11] Patent Number: 4,930,176
[45] Date of Patent: Jun. 5, 1990

[54] COMBINATION HEATED SCRAPER AND BRUSH

[76] Inventor: Gideon Gelman, 211 E. Ohio, Apt. 1201, Chicago, Ill. 60611

[21] Appl. No.: 383,920

[22] Filed: Jul. 21, 1989

[51] Int. Cl.⁵ .............................. B60S 1/04; A47L 1/05
[52] U.S. Cl. ................................................ 15/4; 15/23; 15/105; 15/236.02; 219/227
[58] Field of Search ...................... 15/4, 213, 28, 93 R, 15/236.02; 219/227, 228; 134/6

[56] References Cited

U.S. PATENT DOCUMENTS

| | | | |
|---|---|---|---|
| 1,599,713 | 9/1926 | Perlman | 15/4 |
| 2,536,844 | 1/1951 | Frederick et al. | 219/21 |
| 2,700,096 | 1/1955 | Clements et al. | 219/21 |
| 2,918,685 | 12/1959 | Sundstrom | 15/4 |
| 3,325,627 | 6/1967 | Adler et al. | 219/227 |
| 3,673,383 | 6/1972 | Sofia | 219/227 |
| 3,711,679 | 1/1973 | Moschkau et al. | 219/227 |
| 3,935,425 | 1/1976 | Weissberger et al. | 219/228 |
| 4,040,140 | 8/1977 | Hopkins et al. | 15/236 R |
| 4,404,705 | 9/1983 | Thoma | 15/313 |
| 4,546,513 | 10/1985 | Hammond | 15/105 |
| 4,662,947 | 5/1987 | Hopkins | 134/6 |

Primary Examiner—Edward L. Roberts
Attorney, Agent, or Firm—Neuman, Williams, Anderson & Olson

[57] ABSTRACT

An ice and snow clearing device includes a brush, a heating element, a scraper and means for electrically powering the heating element. The sweeping member brushes snow or ice from the surface that is to be cleared. The scraper is connected to the rear of the brush to remove snow or ice remaining in the path of the brush. The heating element softens snow or ice remaining on the surface after operation of the brush to facilitate removal by the scraper.

15 Claims, 1 Drawing Sheet

COMBINATION HEATED SCRAPER AND BRUSH

BACKGROUND OF THE INVENTION

1. Field Of The Invention

The invention relates to a device for clearing snow and/or ice from a surface. More particularly the invention relates to a hand held windshield de-icer that comprises a rotatable brush, a heater and a scraper to remove ice and snow from a windshield and other surfaces of a car.

2. Description Of The Prior Art

The accumulation of ice and snow on windshields has been a problem as long as driving has been a winter activity. Compacted snow and ice cling tightly to the smooth surface of the windshield and make its removal difficult. A variety of de-icing devices have been developed in which scrapers having a number of different configurations are employed to remove the ice. Such devices although effective in relatively warm conditions when the snow or ice is soft and therefore readily removable, are not so effective when the snow or ice is compacted and consequently firmly attached to the windshield as is often the case in extreme winter conditions. Under such conditions, the removal of compacted snow or ice with a scraper is likely to be a protracted and somewhat inefficient affair that is necessarily undertaken in conditions far from ideal for the person that must remove the ice or snow.

Other devices have been developed that include a heater with a scraper in an attempt to enable the removal process to be hastened by softening snow or ice to facilitate scraping. Although more effective than the scraper alone, the heating elements of these devices tend to cover a relatively small area and be of relatively low power. As ice and snow covering a surface can at times be of considerable depth, the heater often has insufficient power to melt the snow or ice in contact with the windshield surface. The task of removing snow from a windshield is still likely therefore to take a considerable amount of time.

It is desirable therefore to provide an ice and snow clearing device that removes ice and snow from a surface quickly and efficiently even in extreme conditions, so as to minimize the driver's exposure to the elements and to hasten making the windshield transparent and accordingly allow the driver to begin the safe operation of the vehicle.

OBJECTS OF THE INVENTION

Accordingly it is an object of this invention to provide an improved heated scraper that meets the aforementioned requirements.

It is a specific object of this invention to provide a snow and ice clearing device that enables snow and ice to be quickly and efficiently removed from a smooth surface such as a windshield of a vehicle.

It is another object of this invention to provide a snow and ice clearing device that is easily maneuverable for speed of clearance.

It is a further object of this invention to provide a snow and ice clearing device that uses the electrical power available from the vehicle.

It is a further object of this invention to provide a snow and ice cleaning device which functions as an attachment to currently available automotive accessories such as portable hand held vacuum cleaners.

SUMMARY OF THE INVENTION

In accordance with the preferred embodiment of this invention a snow and ice clearing device which achieves the foregoing objects includes a sweeping member, a heating element, a scraping member forming a detachable accessory to a base power unit which may also function as the power unit for other attachments such as a vacuum. The sweeping element rotates in either direction brushing snow or loosened ice from the surface to be cleaned. The scraping member is positioned downstream from the sweeping member for removing snow and ice remaining on the surface after operation of the sweeping member and propels the snow and loosened ice toward the sweeping member for ultimate removal. The heating element is disposed in proximate relation to the scraping member to soften snow or ice prior to being contacted by the scraping member to facilitate the dislodging of the snow or ice from the surface by the action of the scraper.

The device includes a support structure that includes wheels that rotate to guide the device in the direction of operation. These wheels are fixably mounted on the support structure but still allow the sweeping member to be pressed into firmer contact with the surface to be cleared by the operator either applying pressure to the support structure or tilting the entire unit. Nevertheless, the fixably mounted wheels prevent the contact between the sweeping member and the surface to be cleaned from being so strong as to stall the operation of the sweeper.

The sweeping member is rotatable about an axis parallel to the direction of operation. The device also includes means to rotate the sweeping member about its axis. This means is a base unit including an electrical motor that can be powered by an automobile battery by connection through the cigarette lighter socket of the automobile. This base unit is preferably a standard commercially available unit such as is available in a portable vacuum device sold by Black & Decker or other manufacturers.

BRIEF DESCRIPTION OF THE DRAWINGS

For a more complete understanding of this invention, reference should now be made to the embodiment illustrated in greater detail in the accompanying drawings and described by way of example only. In the drawings.

DETAILED DESCRIPTION OF THE DRAWINGS

Figure 1:
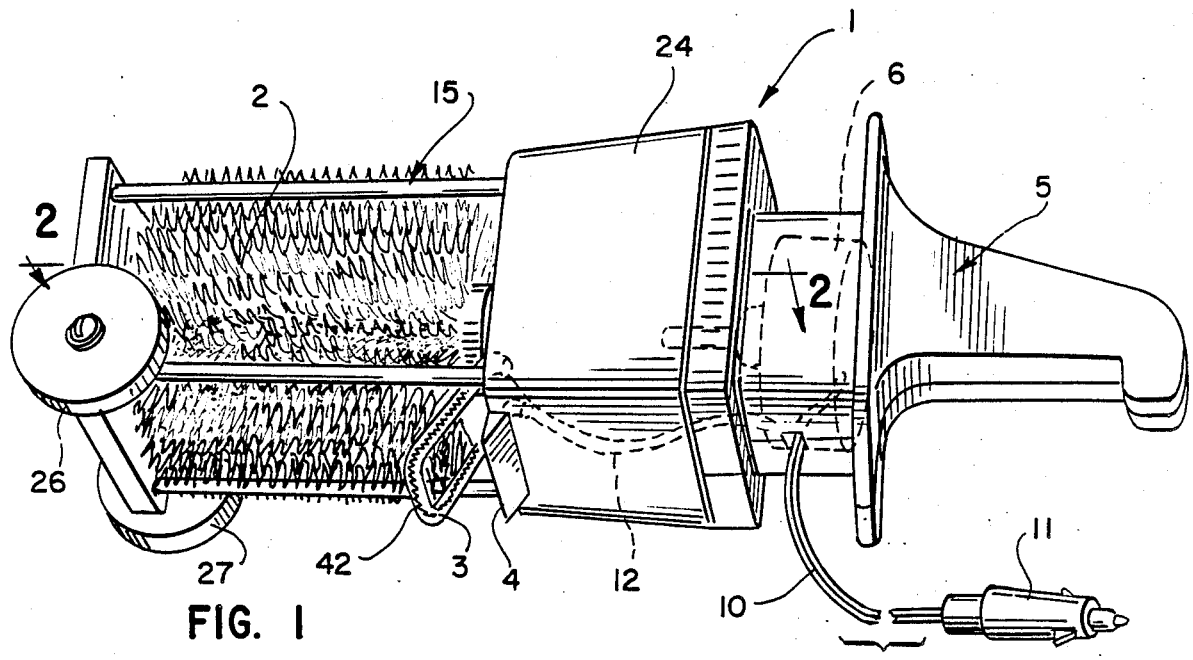
FIG. 1 is a perspective view of a snow and ice clearing device of this invention with the interior driving mechanism shown in broken lines.

FIG. 1 shows the clearing device 1 comprising a rotatable brush 2, a heating element 3 and a scraper 4. The device has a handle section 5 that has an internal motor 6 shown in broken lines that is operable to rotate the brush 2. The motor 6 may be connected to the brush 2 via a clutch and reduction gear so that a rate of revolution of the brush 2 suitable for the condition of the snow and ice covering.

Lead 10, that connects the device to a power supply, terminates at a pin 11 adapted to fit into the cigarette socket of an automobile (not shown) to enable power to be drawn from an automobile battery. The device can therefore be used to clear snow from the windshield and other surfaces of an automobile wherever it is located. The heating element 3 is powered by the automobile battery and is attached to the power supply by cable 12 shown in dotted lines. The connecting pin 11 may of course be adapted to enable the device to be run by power sources other than vehicle batteries such as batteries or an electrical outlet so that snow can be cleared from surfaces other than those of a vehicle if desired. The internal motor 6 and handle 5 may be a commercially available unit adapted to provide power for a number of attachments, such as that available under the trademark BLACK & DECKER. One commercially available appliance that would be particularly adapted to provide power for the device is a 12 VDC car vacuum cleaner. The brushing device is then adapted to replace the filter housing of the vacuum cleaner and snap into connection with the handle of the appliance.

Figure 2:
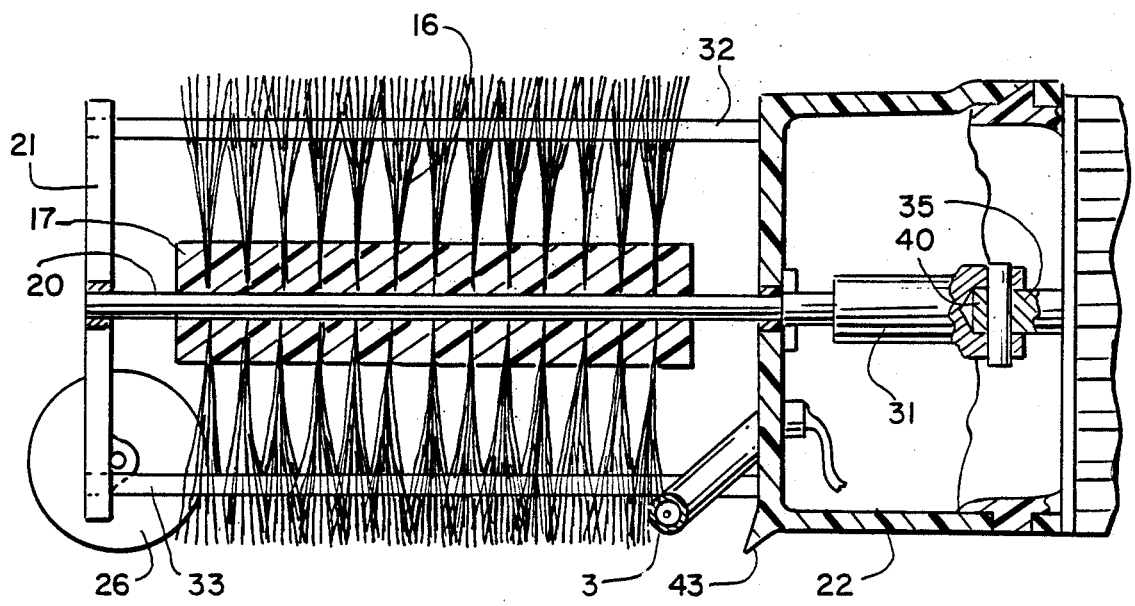
FIG. 2 is a partial longitudinal section through the device of FIG. 1.
Figure 3:
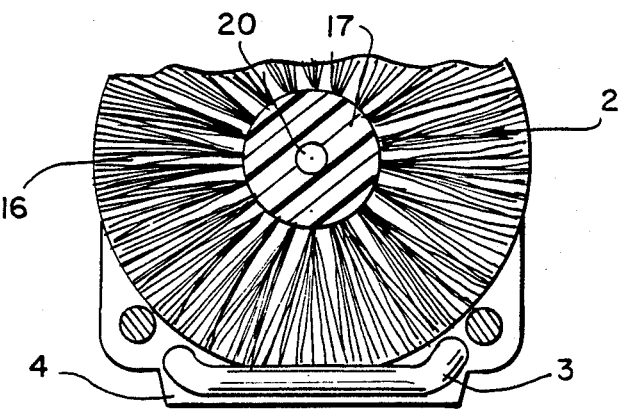
FIG. 3 is a fragmentary transverse section through the device of FIG. 1.

The frame structure 15 supports the brush 2, the heater 3 and the scraper 4. Its construction is more clearly shown in FIGS. 2 and 3. The brush 2 is made from a series of bristles 16 mounted in a cylindrical block 17. A central rod 20 provides an axis about which the brush 2 rotates. The rod 20 extends from an end plate 21 to a handle attachment socket 22. It is rotatably mounted in an opening 23 in the end plate, 21 and an opening 24 in the attachment socket 22. A washer 25 holds the rod 20 in position within the attachment socket 24. The rod 20 terminates at a connection cylinder 31 that is adapted for attachment to the motor 6 located in the handle portion 5. The brush 2 is rotatable in either direction by the motor under the control of the operator. When the device is powered by a high speed D.C. motor it may be necessary to include a reduction gear between the motor and the drive shaft along with a clutch having a snap in connection to engage the gear.

The frame structure 15 includes upper members 32 and lower members 33 generally forming a rectangular cage although any support that allows the brush member to contact the windshield could be utilized. The upper and lower support members 32, 33 extend from the end plate 21 to the handle attachment socket 22. The support members are disposed so that the brush 2 can rotate freely about its axis and so in operation the bristles 16 of the brush 2 are able to extend beyond the frame 15 to make contact with the surface to be cleared.

A pair of wheels 26, 27 are located toward the front of the device. The wheels are aligned to facilitate the movement of the device in the direction of operation in which the scraper 4 works most effectively. The wheels 26, 27 are mounted on the frame to provide an interval between the bristles 16 of the brush 2 and the surface to be cleared. By varying the distance between the brush 2 and the surface to be cleared, by tilting the device or by applying downward pressure to flex the support structure, the force with which the brush strokes snow aside can be adjusted without stalling the motor. Alternatively the wheels may be flexibly mounted on the support structure so that the application of reasonable force by the operator causes the brush 2 to make firmer contact with the surface.

The drive shaft 35 from the motor 6 terminates in a connection pin 40 that fits into the connection cylinder 31 to drive the brush 2. The particular rotational axis of the brush allows snow to be brushed in a direction perpendicular to the direction of operation of the device. This means that in operation snow brushed aside does not hamper the further movement of the device in the direction of operation. The brush 2 is also located forward of both the heater 3 and the scraper 4 so that it leaves a relatively thin layer of ice or compacted snow to be softened by the heater 3 and removed by the scraper 4.

The heater is generally U-shaped while other shapes are within the scope of the present invention, and made of highly heat conductive material and has an internal heating element 42. The bottom of the U is situated in alignment with the blade portion 43 of the scraper that extends transversely of the direction of operation of the device. The heater 3 is positioned so that in operation it does not make contact with the surface that is to be cleared but melts the ice just in front of the scraper 4 situated on the surface. The scraper 4 protrudes in a forward direction at an angle to the vertical and is in a position to make contact with the surface to enable snow and ice to be pared from the surface without damage and forced toward the rotating sweeper.

In operation the device 1 is positioned on the surface to be cleared. The rotation speed for the brush is chosen and the device is connected to the power source. In this position, the wheels 26, 27 at one end and the scraper 4 at the other maintain the interval between the bristles 16 of the brush 2 and the surface. This interval can be varied by the application of a force by the operator that tends to press the bristles 16 toward the surface or by tilting the structure. The variation in this interval is possible because of flexibility in the angle of operation of the device and the resilient flexibility of the support structure. It is particularly useful as it enables the operator to clear loose snow to a variable depth. If the depth to which the brush 2 penetrates the snow on the surface is fixed, the removal of large depths of snow is hampered because compacted snow, more effectively removed by the heater and scraper combination, would slow the operation of the brush 2 and thereby reduce the efficiency of the device. By having flexible bristles 16 and a variable depth of operation, only the snow or ice that is readily removable need be brushed aside leaving the firmly attached ice and compacted snow to be removed by the heater 3 and scraper 4 combination.

To remove snow or ice, the brush is rotated and the heater switched on. The device is moved across the windshield guided by the wheels. Loosely attached snow and ice is brushed from the path of the heater 3 and scraper 4 by the brush 2 as it is pressed into contact with the snow and ice. The heater melts the ice and compacted snow remaining after the brush 2 has passed and softens it for the scraper to remove and force toward the rotating sweeper. In this way the heater 3 is only utilized to loosen firmly attached ice and compacted snow. This reduces the waste in heating capacity of the heater 4 that might otherwise be used to melt ice and snow that could easily be removed by the brush 2.

This device therefore provides an efficient means by which snow and ice can be cleared from any smooth surface and particularly the windshield and other surfaces of an automobile. By using the advantageous operational benefits of a brush, a heater and a scraper working together to effect the maximum usefulness of each, the task of clearing ice and snow is quickly and efficiently accomplished, reducing the period of exposure to wintry conditions and hastening of the start of a journey is enhanced.

As the design of the device allows it to be powered by a standard base unit such as a 12 UDC car vacuum cleaner, it is likely to be used as a further attachment to equipment already kept in an automobile such as a 12 VDC car vacuum cleaner, thus providing a ready market for the device. The compact nature of the device is also ideal for storage in an automobile for use whenever required and in addition makes it easy to manipulate so that an entire surface can be quickly cleared of snow and ice.

While one preferred embodiment of this invention is illustrated, it will be understood, of course that the invention is not limited to this embodiment. Those skilled in the art to which the invention pertains may make modifications and other embodiments employing the principles of the invention, particularly upon considering the foregoing teachings.

What is claimed is:

1. A device for cleaning ice and snow from a surface comprising:
   a frame structure;
   a sweeping member mounted with respect to said frame for rotational movement to remove snow or ice from a surface;
   a scraping member connected to said frame and subtending said sweeping member for directly contacting and loosening the snow and ice remaining on said surface after operation of said sweeping member;
   a heating element connected to said frame positioned in proximate relation to said scraping member for softening the snow and ice prior to the contact by said scraping member; and
   base means connected to said frame and including means to power said heating element and said sweeping element.

2. The device of claim 1 wherein said heating element is disposed between said sweeping member and said scraping member.

3. The device of claim 2 wherein said scraping member comprises a blade member extending laterally of the direction of operation disposed at an angle forward of the vertical.

4. The device of claim 1 further comprising a spacing member connected to said frame for introducing a variable interval between said brushing member and said surface.

5. The device of claim 4 wherein said spacing member comprises at least one wheel mounted on said frame for guiding said device in the direction of operation.

6. The device of claim 1 further comprising a rotatable support shaft on which said sweeping member is connected.

7. The device of claim 6 wherein said shaft extends in the direction of operation of said device and wherein said sweeping member comprises an array of radially extending bristles connected to said shaft.

8. The device of claim 1 wherein said means to power further comprises drive means for rotating said sweeping member.

9. The invention of claim 1 wherein said base means comprises a detachable handle member.

10. A device for clearing ice and snow from a surface comprising:
    a support structure having a shaft extending in the direction of operation;
    a sweeping member, rotatably mounted on said shaft for brushing snow or ice from said surface;
    a heating element mounted on said support structure to the rear of said sweeping member for softening snow and ice on said surface;
    means for electrically powering said heating element and said sweeping member; and
    a scraping member having a blade extending transversely of said shaft for removing snow and ice from said surface softened by said heating element.

11. The device invention of claim 10 further comprising a spacing member for providing a variable interval between said sweeping member and said surface.

12. The device of claim 10 wherein said spacing member comprises at least one wheel mounted on said support structure for guiding said device in the direction of operation.

13. The device of claim 10 wherein said support structure comprises a detachable handle portion.

14. The device of claim 13 wherein said means for electrically powering said sweeping member and said heating element is disposed in said detachable handle portion.

15. A hand held device for clearing ice and snow clearing from the windshield of a vehicle comprising:
    a support structure comprising a shaft, a handle member, a first end member defining the forward end of said device, a second end member defining the rear end of said device, said shaft extending between said first and second end members, and at least one wheel for guiding said device in the direction of operation;
    a sweeping member rotatably mounted on to said support structure and comprising radially extending bristles disposed about said shaft for brushing snow or ice from a surface;
    drive member connected to said support structure for rotating said sweeping member
    a heating element mounted on said support structure to the rear of said sweeping member for softening snow and ice remaining on said surface after operation of said sweeping member;
    means for electrically powering said heating element and said sweeping member;
    a scraping member mounted on said support structure to the rear of said heating element having a blade extending transversely of said shaft, for removing snow and ice softened by said heating element and forcing said softened snow and ice toward said sweeping member.

* * * * *